(12) United States Patent
Cheng et al.

(10) Patent No.: US 11,162,473 B2
(45) Date of Patent: Nov. 2, 2021

(54) CONTROL METHOD AND DEVICE FOR HYDRAULIC CONTROL TURNING SYSTEM OF GENERATOR ROTOR

(71) Applicant: JIANGSU GOLDWIND SCIENCE & TECHNOLOGY CO., LTD., Jiangsu (CN)

(72) Inventors: Wei Cheng, Beijing (CN); Hongfeng Li, Jiangsu (CN); Pengyang Li, Beijing (CN); Endi Zhai, Jiangsu (CN); Xingang Zhang, Jiangsu (CN); Ye Li, Jiangsu (CN)

(73) Assignee: JIANGSU GOLDWIND SCIENCE & TECHNOLOGY CO., LTD., Jiangsu (CN)

( * ) Notice: Subject to any disclaimer, the term of this patent is extended or adjusted under 35 U.S.C. 154(b) by 525 days.

(21) Appl. No.: 16/086,005

(22) PCT Filed: Apr. 20, 2018

(86) PCT No.: PCT/CN2018/083873
§ 371 (c)(1),
(2) Date: Sep. 17, 2018

(87) PCT Pub. No.: WO2019/127997
PCT Pub. Date: Jul. 4, 2019

(65) Prior Publication Data
US 2020/0392941 A1   Dec. 17, 2020

(30) Foreign Application Priority Data

Dec. 28, 2017   (CN) .......................... 201711464107.1

(51) Int. Cl.
*F03D 7/02*      (2006.01)
*F03D 1/06*      (2006.01)
*F03D 80/80*     (2016.01)

(52) U.S. Cl.
CPC .......... *F03D 7/0224* (2013.01); *F03D 1/0691* (2013.01); *F03D 7/02* (2013.01);
(Continued)

(58) Field of Classification Search
CPC ...... F03D 7/0224; F03D 1/0691; F03D 7/026; F03D 7/02; F03D 80/88; F03D 7/00;
(Continued)

(56) References Cited

U.S. PATENT DOCUMENTS

2006/0196288 A1   9/2006 Aust et al.
2008/0276611 A1   11/2008 Gaile et al.
(Continued)

FOREIGN PATENT DOCUMENTS

AU   2012247623 B2   11/2012
CN   101194108 A    6/2008
(Continued)

OTHER PUBLICATIONS

International Search Report and Written Opinion in corresponding PCT Application No. PCT/CN2018/083873, dated Apr. 20, 2018, 10 pages.
(Continued)

*Primary Examiner* — Joseph Ortega
(74) *Attorney, Agent, or Firm* — Bayes PLLC

(57) ABSTRACT

A control method for a hydraulic control turning system of a generator rotor includes: establishing a length relationship table between multiple hydraulic cylinders of the hydraulic control turning system; selecting a reference hydraulic cylinder; acquiring current lengths of the multiple hydraulic cylinders when the multiple hydraulic cylinders are located at error correction positions; and adjusting lengths of the other hydraulic cylinders corresponding to a next driving stroke to conform with the length relationship table. With such an arrangement, the accumulated dimension error
(Continued)

between the hydraulic cylinders may be dynamically corrected during the turning operation, thereby ensuring that the turning pins are accurately aligned with the pin holes in the generator, and the corresponding turning operation is performed after the generator set is locked. Based on this, a control device for a hydraulic control turning system of a generator rotor is further provided.

16 Claims, 8 Drawing Sheets

(52) U.S. Cl.
CPC .............. *F03D 7/026* (2013.01); *F03D 80/88* (2016.05); *F05B 2220/30* (2013.01); *F05B 2240/221* (2013.01); *F05B 2260/507* (2013.01)

(58) Field of Classification Search
CPC ............ F05B 2220/30; F05B 2240/221; F05B 2260/507; F05B 2260/31; F05B 2270/604; Y02E 10/72
See application file for complete search history.

(56) References Cited

U.S. PATENT DOCUMENTS

| | | |
|---|---|---|
| 2012/0181792 A1 | 7/2012 | Pettersen et al. |
| 2014/0110949 A1 | 4/2014 | Brenner et al. |
| 2014/0377062 A1 | 12/2014 | Jakobsen et al. |
| 2015/0299986 A1 | 10/2015 | Ikegami et al. |
| 2016/0298604 A1* | 10/2016 | Guern ................ F16F 13/08 |
| 2017/0051722 A1 | 2/2017 | Knoop |

FOREIGN PATENT DOCUMENTS

| | | |
|---|---|---|
| CN | 201575124 U | 9/2010 |
| CN | 202391864 U | 8/2012 |
| CN | 202451374 U | 9/2012 |
| CN | 103470321 A | 12/2013 |
| CN | 103502635 A | 1/2014 |
| CN | 104246428 A | 12/2014 |
| CN | 105370414 A | 3/2016 |
| CN | 106438197 A | 2/2017 |
| CN | 106762438 A | 5/2017 |
| EP | 2767708 B1 | 6/2015 |
| JP | 2011163324 A | 8/2011 |
| TW | 201100635 A | 1/2011 |
| WO | 2014206482 A1 | 12/2014 |
| WO | 2015071689 A1 | 5/2015 |

OTHER PUBLICATIONS

First Examination Report issued in corresponding Australian Application No. 2018229463, dated Jul. 26, 2019, 6 pages.
First Office Action issued in parallel Chinese Application No. 201711464107.1, dated Nov. 4, 2019, with English Translation, 6 pages.
Supplementary European Search Report issued in corresponding European Application No. EP 18 76 9020.1, dated Apr. 17, 2019, 4 pages.

* cited by examiner

CONTROL METHOD AND DEVICE FOR HYDRAULIC CONTROL TURNING SYSTEM OF GENERATOR ROTOR

This application is the national phase of International Application No. PCT/CN2018/083873, titled "CONTROL METHOD AND DEVICE FOR HYDRAULIC CONTROL TURNING SYSTEM OF GENERATOR ROTOR", filed on Apr. 20, 2018, which claims the priority to Chinese Patent Application No. 201711464107.1, titled "CONTROL METHOD AND DEVICE FOR HYDRAULIC CONTROL TURNING SYSTEM OF GENERATOR ROTOR", filed on Dec. 28, 2017 with the State Intellectual Property Office of People's Republic of China, the disclosures of which applications are incorporated herein by reference.

FIELD

The present application relates to the technical field of wind power generators, and specifically to a control method and device for a hydraulic control turning system of a generator rotor.

BACKGROUND

It is well known that a generator of the wind power generator set is required to be equipped with a turning system in order to carry out the necessary turning operation in particular situations. For example, before re-starting a generator that has not been used for a long time, the bearing of the generator needs to be turned to facilitate forming an oil film; in the process of assembling the wind turbine, the turning operation is performed to cooperate with blade installation; and after the assembly is completed, a check turning operation is carried out to determine whether there is a situation in which a load (that is, a mechanical or transmission part) driven by the generator is stuck due to an increased resistance, so that the generator may not be damaged (i.e. burnout) by the increased starting load. Obviously, a reliably operated turning system is a key indicator for the generator.

Based on this, a hydraulic control turning system driven by hydraulic cylinders is provided in the conventional technology, and the turning system is mounted on a nacelle base 10 and includes five driving units 20 as shown in FIG. 1. The turning system provides a driving force for turning by using five hydraulic cylinders 30. Specifically, the hydraulic cylinders 30 each having one end fixed may drive matched driving units 20 to move, end cover holes of the generator 50 are uniformly distributed in a circumferential direction of an end cover 40 of the generator, and a turning pin 60 of each driving unit 20 moves to be aligned with the target end cover hole of the generator 50 and then is inserted into the hole, as shown in FIGS. 2, 3 and 4. At this time, extending or retracting the hydraulic cylinders 30 may just drive the end cover 40 of the generator to rotate, thereby realizing the turning operation. Taking single blade installation with the illustrated structural configuration as an example, in order to rotate the generator rotor (turning action), the hydraulic system is required to provide a rotation driving force for the generator rotor, and the turning operation driving hydraulic cylinders may drive the generator rotor to rotate by 7.5 degrees in one stroke. When each stroke finishes, the hydraulic cylinders of the turning system return to their initial positions of the stroke one by one, so that a next rotor driving stroke can be performed. The rotor needs to be rotated by 120 degrees for installing each blade, in other words, for installing one blade, the turning system needs to reciprocate 120/7.5=16 strokes. Limited by its own structure, the turning system generates a position error in each stroke, and after 16 strokes, the accumulated position error usually exceeds the position error allowed by design, which may cause that the turning pins of the turning system cannot be inserted into the end cover holes of the generator and thus the turning operation is failed.

In view of this, it is urgent to optimize the design of the conventional turning system to effectively address the issue of stroke error of the turning system, so that the turning pins can be accurately inserted into the end cover holes of the generator.

SUMMARY

In order to address the above technical issues, a control method and device for a hydraulic turning system of a generator rotor are provided according to the present application, which can dynamically correct the accumulated errors during the operation of the hydraulic control turning system, thereby greatly improving the operation accuracy and operation reliability of the turning system.

The control method for a hydraulic control turning system of a generator rotor according to the present application includes the following steps:

establishing a length relationship table between multiple hydraulic cylinders of the hydraulic control turning system;

selecting a reference hydraulic cylinder;

acquiring current lengths of the multiple hydraulic cylinders when the multiple hydraulic cylinders are located at error correction positions, wherein the error correction positions are positions where the hydraulic cylinders are located after completing at least one driving stroke; and adjusting lengths of other hydraulic cylinders corresponding to a next driving stroke to conform to the length relationship table, with the current length of the reference hydraulic cylinder as a determining reference.

Preferably, the error correction positions are positions where the hydraulic cylinders are located after completing multiple driving strokes.

Preferably, the number of the driving strokes is determined depending on a working condition of the turning operation.

Preferably, the working condition of the turning operation is a working condition of blade installation.

Preferably, before obtaining current lengths of the multiple hydraulic cylinders when the multiple hydraulic cylinders are located at the error correction positions, the following steps are performed:

obtaining a reference length of the reference hydraulic cylinder when it is located at a target working position, wherein the target working position is a position where the corresponding turning pin of the reference hydraulic cylinder is inserted into a fitting hole; and performing a function inspection of movement execution modules for the multiple hydraulic cylinders in sequence based on the reference length and the length relationship table, including: moving each of the multiple hydraulic cylinders to an turning limit position, and inserting the turning pin into the fitting hole or pull the turning pin out of the fitting hole to determine that the turning system meets a first starting condition.

Preferably, in the function inspection of the movement execution modules, an insertion signal and a pullout signal of each of the turning pins are acquired to determine that the turning system meets the first starting condition.

Preferably, the method further includes:

performing a limit position inspection for each of the multiple hydraulic cylinders, including: moving each of the multiple hydraulic cylinders to a limit position of the cylinder.

Preferably, the limit position inspection further includes acquiring lengths of the hydraulic cylinders at the limit positions to determine that the turning system meets a second starting condition.

Preferably, the reference hydraulic cylinder is a hydraulic cylinder of the multiple hydraulic cylinders having a minimum angle with respect a horizontal plane.

A control device for a hydraulic control turning system of a generator rotor according to the present application includes a first detecting unit, a storage unit and a control unit. The first detecting unit is configured to acquire current lengths of multiple hydraulic cylinders when the multiple hydraulic cylinders are located at error correction positions. The storage unit is configured to store a length relationship table between the multiple hydraulic cylinders of the hydraulic control turning system. The control unit is configured to adjust lengths of other hydraulic cylinders corresponding to a next driving stroke to conform to the length relationship table, with a current length of a reference hydraulic cylinder as a determining reference.

Preferably, the first detecting unit is further configured to acquire a reference length of the reference hydraulic cylinder when it is located at the target working position, to allow the control unit to control the multiple hydraulic cylinders to perform a function inspection of movement execution modules in sequence based on the reference length and the length relationship table. The function inspection of the movement execution modules includes: moving the multiple hydraulic cylinders to limit positions of the turning, and inserting the turning pin into the fitting hole or pull the turning pin out of the fitting hole.

Preferably, the control unit is further configured to control the multiple hydraulic cylinders to each perform a limit position inspection, and the limit position inspection includes moving each of the multiple hydraulic cylinders to a limit position thereof.

Preferably, the control device further includes: a second detecting unit configured to acquire an insertion signal and a pullout signal of each of the turning pins, and output the insertion signal and the pullout signal to the control unit to determine that the turning system meets a starting condition.

For the hydraulic control turning system, the above turning control technical solution is inventively provided according to the present application, and has the following beneficial effects compared with the conventional technology.

Firstly, when performing the turning operation, in the solution, an error correction may be performed at a selected position based on the length relationship table between the hydraulic cylinders of the hydraulic control turning system. After the reference hydraulic cylinder is selected, a current length of the reference hydraulic cylinder is taken as a determining reference to adjust lengths of the other hydraulic cylinders corresponding to a next driving stroke to conform to the length relationship table. With such an arrangement, the accumulated dimension error among the hydraulic cylinders may be dynamically corrected during the turning operation, thus ensuring that the turning pins are accurately aligned with the pin holes in the generator, and the corresponding turning operation is completed after the generator set is locked, thereby greatly improving the operation accuracy and operation reliability of the turning system.

Secondly, in a preferred solution of the present application, the error correction positions are positions where the hydraulic cylinders are located after completing multiple driving strokes, which can achieve a better dynamic error correction effect and also has good correction efficiency. In addition, the number of the driving strokes may be determined according to a working condition of the turning operation, and a dynamic correction and adjustment moment is selected according to the characteristics of different working conditions, thus the accuracy and error correction efficiency are balanced to the utmost extent.

Thirdly, a turning start self-inspection step is provided according to another preferred solution of the present application. Before the system starts working, a reference length of the reference hydraulic cylinder when it is at the target working position is taken as a reference point, which is equivalent to the coordinate origin of the self-inspection step; and based on the inherent length relationships between the multiple hydraulic cylinders and the reference length of the reference hydraulic cylinder, the hydraulic cylinders are controlled to move in sequence to the turning limit positions, and are controlled to insert the turning pins into the fitting holes or to pull the turning pins out of the fitting holes, thereby determining that the first start condition is met, that is, the function inspection of the movement execution module is completed. With such an arrangement, the operation safety and reliability of the hydraulic control turning system can be effectively ensured, thereby greatly improving the operation efficiency of the whole device on the premise of completely avoiding the adverse effects of negative factors on the turning operation.

Fourthly, in a preferred solution of the present application, a limit position inspection may be performed for the multiple hydraulic cylinders to verify that each hydraulic cylinder can move to its own limit position, and to confirm that the hydraulic cylinder itself has a good starting basis. Moreover, after the limit position inspection determines that the second starting condition is met, the function inspection of movement execution module is performed to ensure the reliability of the turning operation to the utmost extent.

Finally, according to the present application, a hydraulic cylinder having a smallest angle with respect to the horizontal plane is preferably taken as the reference hydraulic cylinder, and the reference hydraulic cylinder has almost no load in a free state, or has a minimum load in a free state. Taking the reference hydraulic cylinder as a control reference may achieve the optimal accuracy.

BRIEF DESCRIPTION OF THE DRAWINGS

To illustrate technical solutions in the embodiments of the present application or in the conventional technology more clearly, the drawings to be used in the description of the conventional technology or the embodiments are described briefly hereinafter. Apparently, the drawings described hereinafter are only some embodiments of the present application, and other drawings may be obtained by the person skilled in the art based on these drawings without creative efforts.

Figure 1:
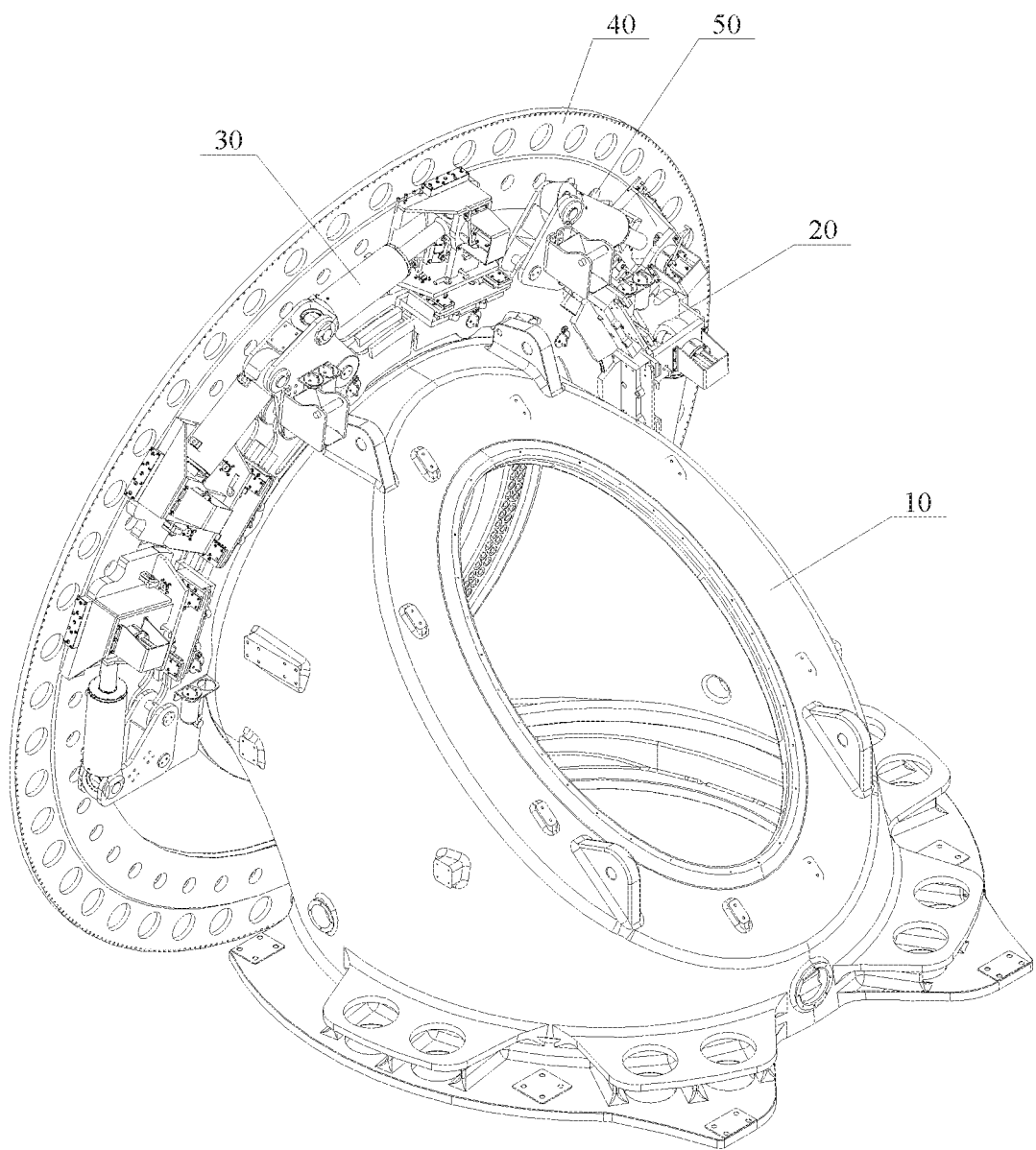
FIG. 1 is a schematic axonometric view of a hydraulic control turning system of a generator rotor.

Reference numerals in FIGS. 1 to 4:

| | |
|---|---|
| 10 nacelle base, | 20 driving unit, |
| 30 hydraulic cylinder, | 40 end cover of generator, |
| 50 end cover hole of generator, | 60 turning pin; |

Figure 2:
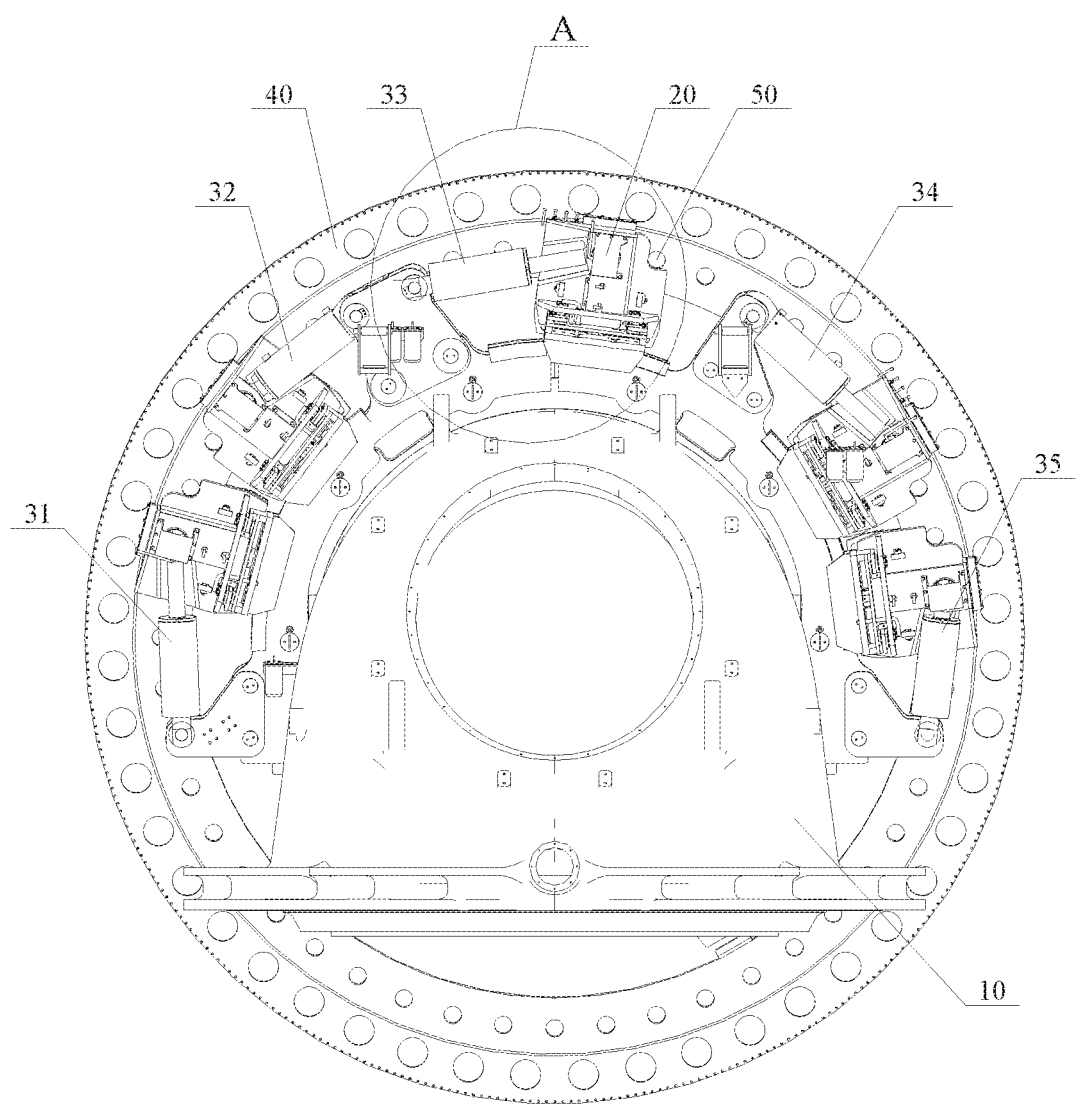
FIG. 2 is a front view of the turning system in FIG. 1.
Figure 3:
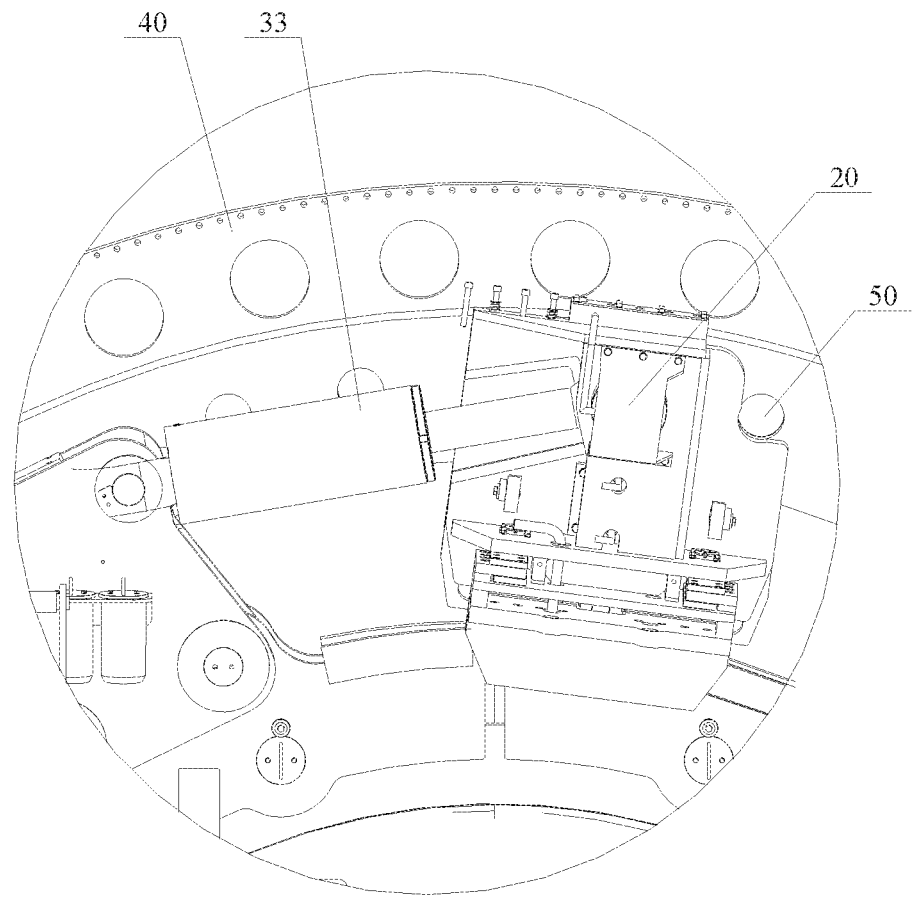
FIG. 3 is a partially enlarged schematic view of part "A" in FIG. 2.
Figure 4:
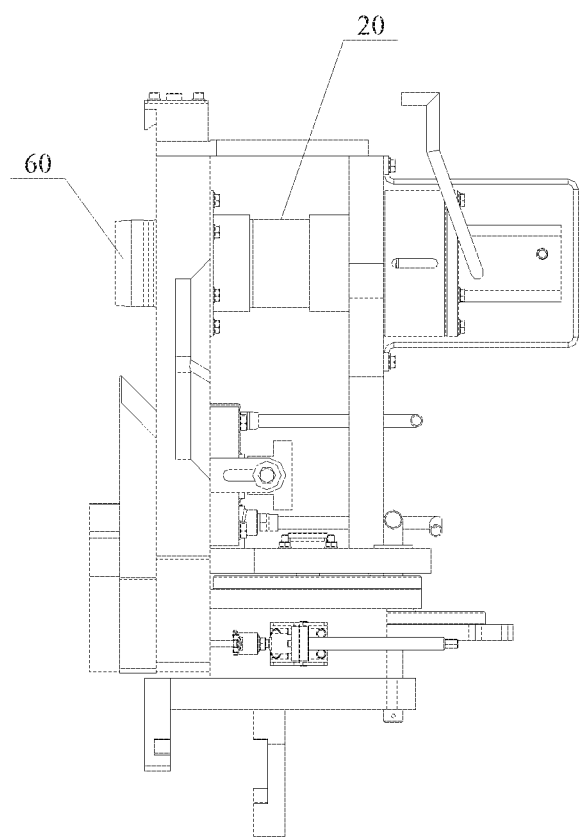
FIG. 4 is a side view of a driving unit of the hydraulic control turning system of the generator rotor.

Reference numerals in FIG. 2:

| | |
|---|---|
| 31 first hydraulic cylinder, | 32 second hydraulic cylinder, |
| 33 third hydraulic cylinder, | 34 fourth hydraulic cylinder, |
| 35 fifth hydraulic cylinder; | |

Figure 8:
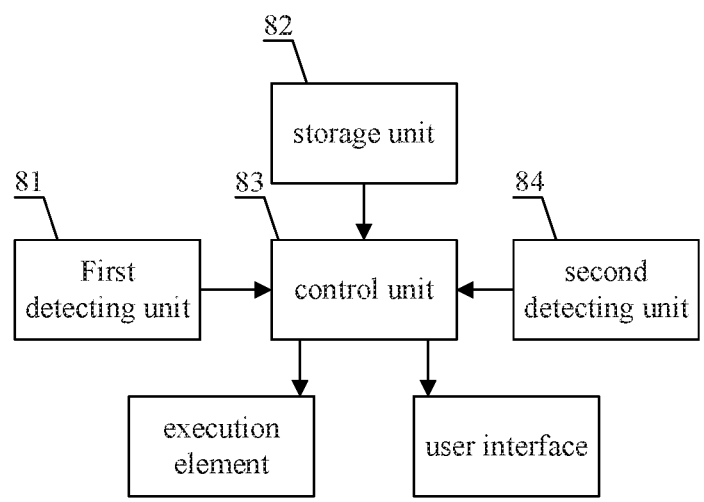
FIG. 8 is a unit block diagram of a control device for a hydraulic control turning system of a generator rotor according to an embodiment of the present application.

Reference numerals in FIG. 8:

| | |
|---|---|
| 81 first detecting unit, | 82 storage unit, |
| 83 control unit, | 84 second detecting unit. |

DETAIL DESCRIPTION OF EMBODIMENTS

In order to make the person skilled in the art to better understand the solutions of the present application, the present application is described in detail hereinafter in conjunction with the drawings and embodiments.

Without loss of generality, the hydraulic control turning system shown in FIGS. 1 and 2 is taken as a main description object in this embodiment. The system adopts five sets of driving units accompanied by five matched hydraulic cylinders to provide the driving force. As shown in the figures, the assembly directions of the first hydraulic cylinder 31, the third hydraulic cylinder 33, and the fourth hydraulic cylinder 34 are coincident, and the assembly directions of the second hydraulic cylinder 32 and the fifth hydraulic cylinder 35 are coincident. The hydraulic cylinders are respectively push cylinders and pull cylinders relative to a rotation direction of the turning system. Specifically, a. when the generator rotates clockwise, the first hydraulic cylinder 31, the third hydraulic cylinder 33 and the fourth hydraulic cylinder 34 belong to the push cylinder group, and the second hydraulic cylinder 32 and the fifth hydraulic cylinder 35 belong to the pull cylinder group; and b. when the generator rotates counterclockwise, the first hydraulic cylinder 31, the third hydraulic cylinder 33 and the fourth hydraulic cylinder 34 belong to the pull cylinder group, and the second hydraulic cylinder 32 and the fifth hydraulic cylinder 35 belong to the push cylinder group.

The turning system cooperates with a wind power generator rotor (not shown in the figures) having three blades to perform the turning operation. The turning driving hydraulic cylinders may drive the generator rotor to rotate by 7.5 degrees in one stroke, and the rotor needs to be rotated by 120 degrees for installing one blade, which means the turning system needs to reciprocate 120/75=16 strokes.

The terms are explained as follows.

Movement limit of hydraulic cylinder refers to a length limit which the hydraulic cylinder itself can extend and retract, including the longest extending length and the shortest retracting length. For example the movement limit of hydraulic cylinder is 0 mm to 400 mm, the shortest limit position means that the shortest length that the hydraulic cylinder can retract is 0 mm, and the longest limit position means that the longest length that the hydraulic cylinder can extend is 400 mm.

Turning movement limit of hydraulic cylinder refers to a length limit which the hydraulic cylinder itself can extend and retract in a control process of the turning system. For example, the turning movement limit of hydraulic cylinder is 10 mm to 390 mm, the shortest turning limit position refers to that the shortest length that the hydraulic cylinder can retract is 10 mm under the operation of the turning system, and the longest turning limit position refers to that the longest length that the hydraulic cylinder can extend is 390 mm under the operation of the turning system.

Centering refers to that the center line of a pin coincides with the center line of a hole.

Figure 5:
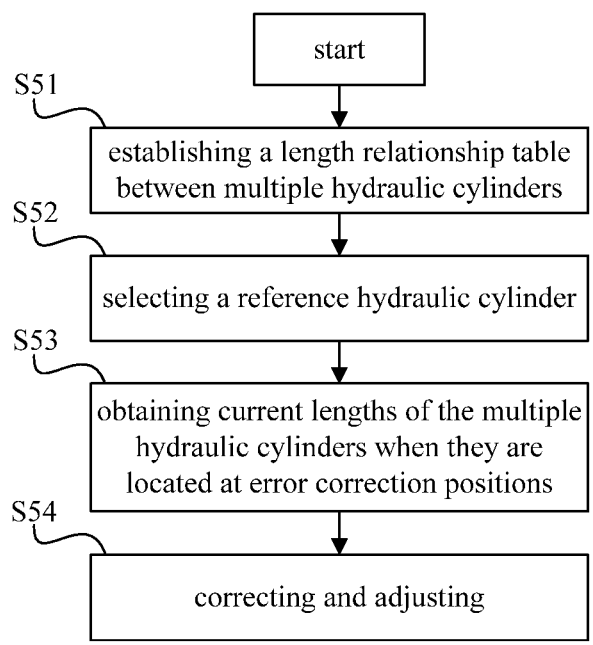
FIG. 5 is a flow chart of a control method for the hydraulic control turning system of the generator rotor according to a first embodiment.

Referring to FIG. 5. FIG. 5 is a flow chart of a control method according to an embodiment of the present application, and the control method is used for a hydraulic control turning system of the generator rotor.

As shown in FIG. 5, the control method includes the following steps S51-S54.

S51 may include establishing a length relationship table between multiple hydraulic cylinders.

The dimension relationships between the multiple hydraulic cylinders of the hydraulic control turning system are fixed, and this is based on the fact that for the hydraulic cylinders employed in each set of hydraulic control turning system, length relationships, i.e., difference relationships, are determined theoretically. The length relationship table may show the dimension relationships respectively established between a reference hydraulic cylinder and other hydraulic cylinders, or may show dimension relationships respectively established between the hydraulic cylinders.

S52 may include selecting the reference hydraulic cylinder.

The third hydraulic cylinder 33 that is substantially horizontal may be selected as the reference hydraulic cylinder. In the free state, this hydraulic cylinder has almost no load, while other hydraulic cylinders have self-weight load of driving units, and an optimal accuracy may be obtained by taking the third hydraulic cylinder 33 as a control reference. In fact, the attitude angles of hydraulic cylinders in different systems have different overall design requirements. Preferably, a hydraulic cylinder of the hydraulic cylinders having the smallest angle with respect to the horizontal plane is taken as the reference hydraulic cylinder, which just meets the requirement for avoiding the effect of the self-weight load as mentioned above.

S53 may include obtaining current lengths of the five hydraulic cylinders when the cylinders are located at error correction positions.

At this moment, the turning system enters a turning operation state. Specifically, the error correction positions are working positions where the above hydraulic cylinders are located when the hydraulic cylinders complete at least one driving stroke, that is, the moment when an error correction processing is started. It should be understood that, determining the error correction positions using working positions when multiple driving strokes are completed can achieve a better dynamic error correction effect and can also have a good correction efficiency. For example, taking four driving strokes as a dynamic correction cycle point, that is, for each time the rotor is rotated by 30 degrees (7.5 degrees×4=30 degrees), the lock pins of the wind turbine and the pin holes of the generator may be centered, and the wind turbine may be locked.

It should be noted that, according to the core design concept of the solution, the number of driving strokes is not limited to four as described, and the dynamic error correction position may be determined according to other options, and may be determined according to the working condition of the turning operation as long as it is matched with the wind turbine. Obviously, selecting the dynamic correction and adjustment moment according to the characteristics of different working conditions may balance the accuracy and error correction efficiency to the utmost.

S54 may include correcting and adjusting.

A current length of the third hydraulic cylinder (the reference hydraulic cylinder) is taken as a determining reference to adjust the lengths of the other hydraulic cylinders corresponding to the next driving stroke until the lengths conforming to the length relationship table. For example, at the error correction position, the current length of the third hydraulic cylinder as the reference hydraulic cylinder is 101 mm, the current length of the first hydraulic cylinder is 100.5 mm, and a length difference between the first hydraulic cylinder and the third hydraulic cylinder in the length relationship table is 2 mm, in other words, the first hydraulic cylinder is longer than the third hydraulic cylinder by 2 mm, the first hydraulic cylinder needs to be adjusted in the next driving stroke, and the length of the first hydraulic cylinder corresponding to the next driving stroke is controlled to be 103 mm.

An installation process of a blade is described hereinafter to briefly illustrate the specific dynamic correction process in this embodiment.

1. The turning system begins to start and rotates by a first stroke of 7.5 degrees, and after the stroke is finished, the five driving hydraulic cylinders return one by one, and the turning driving pins are inserted into the end cover holes of the generator to prepare for the next stroke.

2. The turning system rotates by a second stroke of 7.5 degrees, and after the stroke is finished, the five driving hydraulic cylinders return one by one, and the turning driving pins are inserted into the end cover holes of the generator to prepare for the next stroke.

3. The turning system rotates by a third stroke of 7.5 degrees, and after the stroke is finished, the five driving hydraulic cylinders return one by one, and the turning driving pins are inserted into the end cover holes of the generator to prepare for the next stroke.

4. The turning system rotates by a fourth stroke of 7.5 degrees, and after the stroke is finished, the five driving hydraulic cylinders return one by one, and the turning driving pins are inserted into the end cover holes of the generator.

5. Before starting a fifth stroke, the control system takes the length of the third hydraulic cylinder 33 finishing the fourth stroke as a reference, and re-controls the lengths of the other four hydraulic cylinders according to the theoretical difference relationships between the third hydraulic cylinder 33 and the other four hydraulic cylinders to perform the next reciprocating movement. Thus, a dynamic error correction is achieved.

Figure 6:
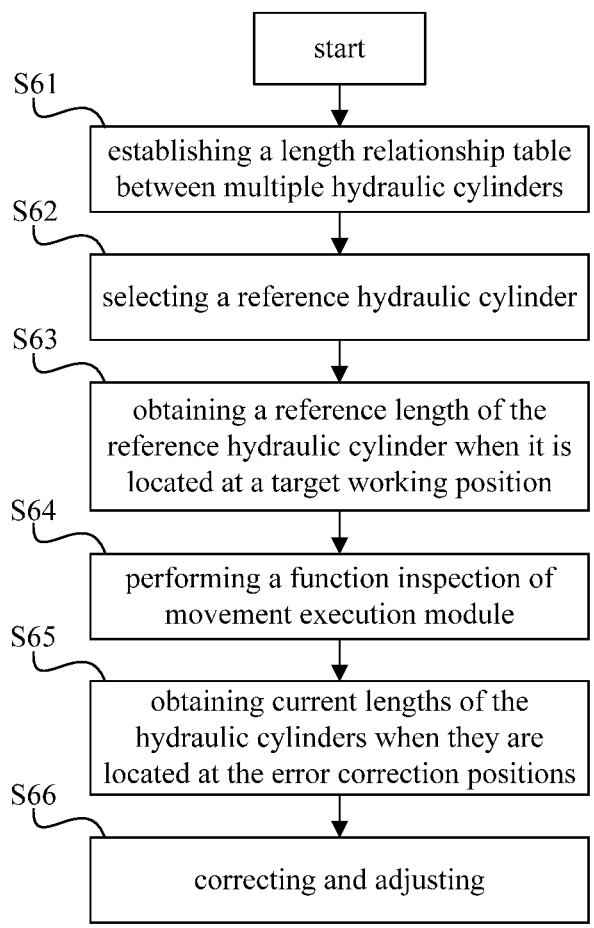
FIG. 6 is a flow chart of a control method for the hydraulic control ng system of the generator rotor according to a second embodiment.

Referring to FIG. 6, FIG. 6 is a flow chart of a control method according to a second embodiment of the present application. Compared with the first embodiment, a self-inspection step before starting the turning system is added before the dynamic error correction in this embodiment.

As shown in FIG. 6, the control method for the hydraulic control turning system of the generator rotor includes the following steps S61 to S66.

S61 may include establishing a length relationship table between multiple hydraulic cylinders;

The dimension relationships between the multiple hydraulic cylinders of the hydraulic control turning system are fixed, and this is based on the fact that for the hydraulic cylinders employed in each set of hydraulic control turning system, length relationships, i.e., difference relationships, are determined theoretically. The length relationship table may show the dimension relationships respectively established between a reference hydraulic cylinder and other hydraulic cylinders, or may show dimension relationships respectively established between the hydraulic cylinders.

S62 may include selecting the reference hydraulic cylinder.

The third hydraulic cylinder 33 that is substantially horizontal may be selected as the reference hydraulic cylinder. In a free state, the hydraulic cylinder has almost no load, while other hydraulic cylinders have self-weight loads of the driving units, and an optimal accuracy may be obtained by taking the third hydraulic cylinder 33 as a control reference. In fact, the attitude angles of hydraulic cylinders in different systems have different overall design requirements. Preferably, a hydraulic cylinder of the hydraulic cylinders having a smallest angle with respect to the horizontal plane is taken as the reference hydraulic cylinder, which just meets the requirement for avoiding the effect of the self-weight loads mentioned above.

S63 may include obtaining a reference length of the reference hydraulic cylinder when it is located at a target working position.

It should be noted that the "target working position" described herein is a position where the corresponding turning pin of the reference hydraulic cylinder is inserted into the fitting hole, that is, the turning pin is centered with the hole in the generator end cover and the turning pin may be inserted into the end cover hole of the generator.

Preferably, obtaining a reference length of the reference hydraulic cylinder when it is located at the target working position is controlled manually. The control system controls the third hydraulic cylinder to extend in the manual operation mode, and the turning driving pin is centered with the hole in the generator end cover by visual observation or a sensor, and the turning driving pin is inserted into the end cover hole of the generator.

S64 may include performing a function inspection of movement execution module.

Based on the reference length and the length relationship table, a function inspection of movement execution module is performed for the five hydraulic cylinders in sequence: the five hydraulic cylinders are moved to their respective turning limit positions, to insert the turning pins into the fitting holes or to pull the turning pins out of the fitting holes to determine that the turning system meets a first starting condition, that is, to inspect the turning movement limits of the hydraulic cylinders and inspect whether a fitting interface between the generator and the movement module meet the conditions of turning operation.

Specifically, in the function inspection of the movement execution modules, the movement may include moving clockwise to the turning limit position and/or moving counterclockwise to the turning limit position.

For the counterclockwise movement inspection, an operation order of the five hydraulic cylinders is as follows.

Firstly, the function inspection of the movement execution module for the fifth hydraulic cylinder 35 is performed:
   a) the fifth hydraulic cylinder 35 moves to the longest turning limit position;
   b) the turning pin is centered with the end cover hole of the generator and is inserted into the hole; and
   c) the turning pin is pulled out from the end cover hole.

Secondly, the function inspection of the movement execution module for the fourth hydraulic cylinder 34 is performed:
   a) the fourth hydraulic cylinder 34 moves to the shortest turning limit position;
   b) the turning pin is centered with the end cover hole of the generator and is inserted into the end cover hole; and
   c) the turning pin is pulled out from the end cover hole.

Thirdly, the function inspection of the movement execution module for the third hydraulic cylinder 33 is performed.
   a) the third hydraulic cylinder 33 moves to the shortest turning limit position;
   b) the turning pin is centered with the end cover hole of the generator and is inserted into the hole; and
   c) the turning pin is pulled out from the end cover hole.

Fourthly, the function inspection of the movement execution module for the second hydraulic cylinder 32 is performed.
   a) the second hydraulic cylinder 32 moves to the longest turning limit position;
   b) the turning pin is centered with the end cover hole of the generator and is inserted into the hole; and
   c) the turning pin is pulled out from the end cover hole.

Fifthly, the function inspection of the movement execution module for the first hydraulic cylinder 31 is performed.
   a) the first hydraulic cylinder 31 moves to the shortest turning limit position;
   b) the turning pin is centered with the end cover hole of the generator and is inserted into the hole; and
   c) the turning pin is pulled out from the end cover hole.

For the clockwise movement inspection, an operation order of the five hydraulic cylinders is as follows:

Firstly, the function inspection of the movement execution module for the first hydraulic cylinder 31 is performed.
   a) the first hydraulic cylinder 31 moves to the longest turning limit position;
   b) the turning pin is centered with the end cover hole of the generator and is inserted into the hole; and
   c) the turning pin is pulled out from the end cover hole.

Secondly, the function inspection of the movement execution module for the second hydraulic cylinder 32 is performed.
   a) the second hydraulic cylinder 32 moves to the shortest turning limit position;
   b) the turning pin is centered with the end cover hole of the generator and is inserted into the hole; and
   c) the turning pin is pulled out from the end cover hole.

Thirdly, the function inspection of the movement execution module for the third hydraulic cylinder 33 is performed.
   a) the third hydraulic cylinder 33 moves to the longest turning limit position;
   b) the turning pin is centered with the end cover hole of the generator and is inserted into the hole; and
   c) the turning pin is pulled out from the end cover hole.

Fourthly, the function inspection of the movement execution module for fourth hydraulic cylinder 34 is performed.
   a) the fourth hydraulic cylinder 34 moves to the longest turning limit position;
   b) the turning pin is centered with the end cover hole of the generator and is inserted into the hole; and
   c) the turning pin is pulled out from the end cover hole.

Fifthly, the function inspection of the movement execution module for the fifth hydraulic cylinder 35 is performed.
   a) the fifth hydraulic cylinder 35 moves to the shortest turning limit position;
   b) the turning pin is centered with the end cover hole of the generator and is inserted into the hole; and
   c) the turning pin is pulled out from the end cover hole.

Here, the step of inspecting the turning movement limits of the hydraulic cylinders and inspecting whether the fitting interfaces between the generator and the movement modules meet the conditions of turning operation, may be accomplished by manual observation of corresponding fitting components, or may be automatically determined and confirmed by obtaining insertion signals and pullout signals of the turning pins, and the determination and confirmation result is fed back to the operator through an user interface, or is synchronously saved to a system management database.

S65 may include obtaining current lengths of the five hydraulic cylinders when the cylinders are located at the error correction positions.

At this moment, the turning system enters a turning operation state. Specifically, the error correction positions are working positions where the above hydraulic cylinders are located when the hydraulic cylinders complete at least one driving stroke.

S66 may include correcting and adjusting.

With the current length of the reference hydraulic cylinder as a determining reference, the lengths of the other hydraulic cylinders corresponding to the next driving stroke are adjusted to conform to the length relationship table.

Figure 7:
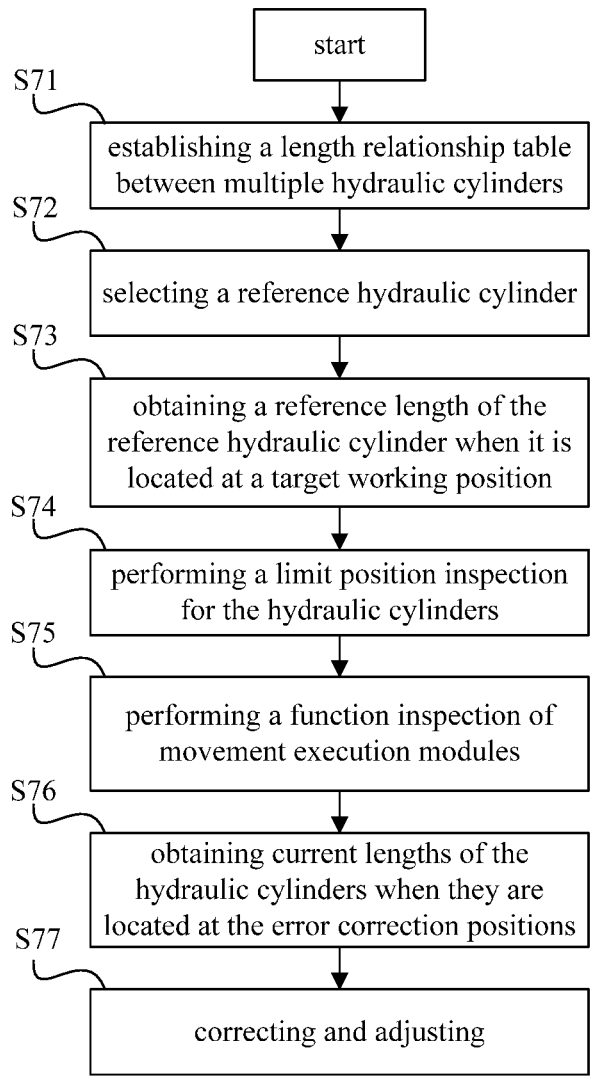
FIG. 7 is a flow chart of a control method for the hydraulic control turning system of the generator rotor according to a third embodiment.

Referring to FIG. 7, FIG. 7 is a flow chart of a control method according to a third embodiment of the present application. As shown in FIG. 7, unlike the second embodiment, this embodiment has a limit position inspection of the hydraulic cylinders added in the self-inspection step, and the control method for the hydraulic control turning system of the generator rotor includes the following steps S71 to S77.

S71 may include establishing a length relationship table between multiple hydraulic cylinders.

The dimension relationships between the multiple hydraulic cylinders of the hydraulic control turning system are fixed, and this is based on the fact that for the hydraulic cylinders employed in each set of hydraulic control turning system, length relationships, i.e., difference relationships, are determined theoretically. The length relationship table may show the dimension relationships respectively established between a reference hydraulic cylinder and other hydraulic cylinders, or may show dimension relationships respectively established between the hydraulic cylinders.

S72 may include selecting a reference hydraulic cylinder.

The third hydraulic cylinder 33 that is substantially horizontal may be selected as the reference hydraulic cylinder. In a free state, the hydraulic cylinder has almost no load, while other hydraulic cylinders have loads of self-weight of the driving units, and an optimal accuracy may be obtained by taking the third hydraulic cylinder 33 as a control reference. In fact, the attitude angles of hydraulic cylinders in different systems have different overall design requirements. Preferably, a hydraulic cylinder of the hydraulic cylinders having a smallest angle with respect to the horizontal plane is taken as the reference hydraulic cylinder, which just meets the requirement for avoiding the effect of self-weight load as mentioned above.

S73 may include obtaining a reference length of the reference hydraulic cylinder when it is located at a target working position.

The third hydraulic cylinder 33 that is substantially horizontal may be selected as the reference hydraulic cylinder. In a free state, the hydraulic cylinder has almost no load. As previously described, the "target working position" described herein is a position where the corresponding turning pin of the reference hydraulic cylinder is inserted into the fitting hole.

S74 may include performing a limit position inspection for the hydraulic cylinders.

The limit position inspection is performed for each of the multiple hydraulic cylinders to verify that each hydraulic cylinder can move to its own limit position. The limit position inspection here may determine that the turning system meets a second starting condition, that is, confirm that the hydraulic cylinders themselves have a good starting basis, by obtaining lengths of the hydraulic cylinders at the limit positions.

S75 may include performing a function inspection of movement execution module, which is specifically similar to the first embodiment.

It should be understood that, the execution order of the function inspection of the movement execution modules and the limit position inspection for the hydraulic cylinders is not specifically limited herein. After it is determined through the limit position inspection that the second starting condition is met, the function inspection of the movement execution modules is performed, which may obviously ensure the reliability of the turning operation to the utmost extent.

To be specific, in the limit position inspection, the movement may also include moving clockwise to the limit position and/or moving counterclockwise to the limit position. Of course, the movement direction of the limit position inspection and the movement direction of the function inspection of the movement execution modules should be consistent with each other.

The limit position inspection and the function inspection of the movement execution modules are respectively operated in the sequence that the hydraulic cylinders respectively move clockwise first, then move counterclockwise, which is described in detail as follows.

Firstly, the five driving hydraulic cylinders move counterclockwise one by one to the limit positions of the hydraulic cylinders.

a) the first hydraulic cylinder 31 moves counterclockwise to the shortest limit position;

b) the second hydraulic cylinder 32 moves counterclockwise to the longest limit position;

c) the third hydraulic cylinder 33 moves counterclockwise to the shortest limit position;

d) the fourth hydraulic cylinder 34 moves counterclockwise to the shortest limit position; and e) the fifth hydraulic cylinder 35 moves counterclockwise to the longest limit position.

Secondly, the function inspection of the movement execution module for the fifth hydraulic cylinder 35 is performed.

a) the fifth hydraulic cylinder 35 moves to the longest turning limit position;

b) the turning pin is centered with the end cover hole of the generator and is inserted into the hole; and c) the turning pin is pulled out from the end cover hole.

Thirdly, the function inspection of the movement execution module for the fourth hydraulic cylinder 34 is performed.

a) the fourth hydraulic cylinder 34 moves to the shortest turning limit position;

b) the turning pin is centered with the end cover hole of the generator and is inserted into the hole; and c) the turning pin is pulled out from the end cover hole;

Fourthly, the function inspection of the movement execution module for the third hydraulic cylinder 33 is performed.

a) the third hydraulic cylinder 33 moves to the shortest turning limit position;

b) the turning pin is centered with the end cover hole of the generator and is inserted into the hole; and c) the turning pin is pulled out from the end cover hole.

Fifthly, the function inspection of the movement execution module for the second hydraulic cylinder 32 is performed.

a) the second hydraulic cylinder 32 moves to the longest turning limit position;

b) the turning pin is centered with the end cover hole of the generator and is inserted into the hole; and c) the turning pin is pulled out from the end cover hole.

Sixthly, the function inspection of the movement execution module for the first hydraulic cylinder 31 is performed.

a) the first hydraulic cylinder 31 moves to the shortest turning limit position;

b) the turning pin is centered with the end cover hole of the generator and is inserted into the hole; and c) the turning pin is pulled out from the end cover hole.

Seventhly, the five driving hydraulic cylinders move clockwise one by one to the limit positions of the hydraulic cylinders.

a) the fifth hydraulic cylinder 35 moves clockwise to the shortest limit position;

b) the fourth hydraulic cylinder 34 moves clockwise to the longest limit position;

c) the third hydraulic cylinder 33 moves clockwise to the longest limit position;

d) the second hydraulic cylinder 32 moves clockwise to the shortest limit position; and e) the first hydraulic cylinder 31 moves clockwise to the longest limit position.

Eighthly, the function inspection of the movement execution module for the first hydraulic cylinder 31 is performed.

a) the first hydraulic cylinder 31 moves to the longest turning limit position;

b) the turning pin is centered with the end cover hole of the generator and is inserted into the hole; and c) the turning pin is pulled out from the end cover hole.

Ninthly, the function inspection of the movement execution module for the second hydraulic cylinder 32 is performed.

a) the second hydraulic cylinder 32 moves to the shortest turning limit position;

b) the turning pin is centered with the end cover hole of the generator and is inserted into the hole; and c) the turning pin is pulled out from the end cover hole.

Tenthly, the function inspection of the movement execution module for the third hydraulic cylinder 33 is performed.

a) the third hydraulic cylinder 33 moves to the longest turning limit position;

b) the turning pin is centered with the end cover hole of the generator and is inserted into the hole; and c) the turning pin is pulled out from the end cover hole.

Eleventhly, the function inspection of the movement execution module for the fourth hydraulic cylinder 34 is performed.

a) the fourth hydraulic cylinder 34 moves to the longest turning limit position;

b) the turning pin is centered with the end cover hole of the generator and is inserted into the hole; and c) the turning pin is pulled out from the end cover hole.

Twelfth, the function inspection of the movement execution module for the fifth hydraulic cylinder 35 is performed.

a) the fifth hydraulic cylinder 35 moves to the shortest turning limit position;

b) the turning pin is centered with the end cover hole of the generator and is inserted into the hole; and c) the turning pin is pulled out of the end cover hole.

Of course, the limit position inspection and the function inspection of the movement execution module may also be designed such that the cylinders respectively move clockwise first, then move counterclockwise, which may also realize the above self-inspection operation.

S76 may include obtaining current lengths of the five hydraulic cylinders when the cylinders are located at the error correction positions.

At this moment, the turning system enters a turning operation state. Specifically, the error correction positions are working positions where the above hydraulic cylinders are located when the hydraulic cylinders complete at least one driving stroke.

S77 may include correcting and adjusting.

With the current length of the reference hydraulic cylinder as a determining reference, the lengths of the other hydraulic cylinders corresponding to the next driving stroke are adjusted to conform to the length relationship table.

Referring to FIG. 8, FIG. 8 is a unit block diagram of a control device for a hydraulic control turning system of a generator rotor according to an embodiment of the present application.

As shown in FIG. 8, the control device for the hydraulic control turning system of the generator rotor includes a first detecting unit 81, a storage unit 82 and a control unit 83.

Specifically, the first detecting unit 81 acquires the current lengths of the multiple hydraulic cylinders when the multiple hydraulic cylinders are located at the error correction positions. Here, the first detecting unit 81 may acquire signals by a sensor. Since the specific structure principle of the sensor is not the invention point of the present application, those skilled in the art may make a selection based on the concept of the present application, and details of the sensor are not described herein again.

Specifically, the storage unit 82 stores the length relationship table between multiple hydraulic cylinders of the hydraulic control turning system, and the relationship table may be preset based on the hydraulic cylinder parameters of a specific turning system.

Specifically, the control unit 83 is capable of adjusting the lengths of the other hydraulic cylinders corresponding to the next driving stroke to conform to the length relationship table, with the current length of the reference hydraulic cylinder as a determining reference. The accumulated dimension error between the hydraulic cylinders may be dynamically corrected during the turning operation, thereby ensuring that the turning pins are accurately aligned with the pin holes in the generator, and the corresponding turning operation is performed after the generator set is locked.

Further, the first detecting unit 81 further acquires a reference length of the reference cylinder when it is located at the target working position, so as to allow the control unit 83 to issue specific instructions based on the reference length and the length relationship table and control the multiple hydraulic cylinders to perform a function inspection of the movement execution modules in sequence, that is, to move to the limit turning positions, to insert the turning pins into the fitting holes or to pull the turning pins out of the fitting holes. Moreover, the control unit 83 may further issue specific instructions to control the multiple hydraulic cylinders to respectively perform a limit position inspection, that is, to move to the limit positions of the hydraulic cylinders. The control unit 83 may be provided independently, or may adopt a control unit of a control system of the whole set.

In addition, in order to achieve a better user experience, the control device may further include a second detecting unit 84 to acquire insertion signals and pullout signals of the turning pins, and output the signals to the control unit to determine that the turning system meets the first starting condition. Similarly, the second detecting unit 84 may also acquire signals by a sensor. Of course, the first detecting unit 81 which acquires the lengths of the hydraulic cylinders, may also acquire the limit positions of the multiple hydraulic cylinders and the limit positions of the turning, and output the limit positions to the control unit to determine that the turning system meets the second starting condition.

It should be noted that the above embodiments according to the present application are not limited to taking the five hydraulic cylinders in the assembling direction as shown in FIGS. 1 and 2 as the control basis, and it should be understood that the solution falls into the protection scope of the application as long as the core concept of a solution is consistent with this solution.

Only preferred embodiments of the present application are described above, and it should be noted that for an ordinary person skilled in the art, several improvements and modifications can be made without departing from the principles of the present application, and these improvements and modifications should also be deemed to be within the scope of the present application.

The invention claimed is:

1. A control method for a hydraulic control turning system of a generator rotor, comprising:

establishing a length relationship table between a plurality of hydraulic cylinders of the hydraulic control turning system, wherein the length relationship table includes information relating to a relationship between a length of each of the plurality of hydraulic cylinders and the length of the other of the plurality of hydraulic cylinders, the length of each of the plurality of hydraulic cylinders being a measure of how much the hydraulic cylinder is extended or retracted;

selecting a reference hydraulic cylinder;

acquiring current lengths of the plurality of hydraulic cylinders when the plurality of hydraulic cylinders are located at error correction positions, wherein the error correction positions are positions where the hydraulic cylinders are located after completing at least one driving stroke; and adjusting the lengths of the plurality of hydraulic cylinders other than the reference hydraulic cylinder corresponding to a next driving stroke to conform to the length relationship table, with the current length of the reference hydraulic cylinder as a determining reference.

2. The control method for the hydraulic control turning system of the generator rotor according to claim 1, wherein the error correction positions are positions where the plurality of hydraulic cylinders are located after completing a plurality of driving strokes.

3. The control method for the hydraulic control turning system of the generator rotor according to claim 2, wherein the number of the driving strokes is determined depending on a working condition of turning operation.

4. The control method for the hydraulic control turning system of the generator rotor according to claim 3, wherein the working condition of turning operation is blade installation.

5. The control method for the hydraulic control turning system of the generator rotor according to claim 4, wherein before obtaining the current lengths of the plurality of hydraulic cylinders when the plurality of hydraulic cylinders are located at the error correction positions, the following steps are performed:
obtaining a reference length of the reference hydraulic cylinder when it is located at a target working position, wherein the target working position is a position where a corresponding turning pin of the reference hydraulic cylinder is inserted into a fitting hole; and
performing a function inspection of movement execution modules for the plurality of hydraulic cylinders in sequence based on the reference length and the length relationship table, comprising: moving each of the plurality of hydraulic cylinders to a turning limit position, and inserting the turning pin into the fitting hole or pulling the turning pin out of the fitting hole to determine that the turning system meets a first starting condition.

6. The control method for the hydraulic control turning system of the generator rotor according to claim 3, wherein before obtaining the current lengths of the plurality of hydraulic cylinders when the plurality of hydraulic cylinders are located at the error correction positions, the following steps are performed:
obtaining a reference length of the reference hydraulic cylinder when it is located at a target working position, wherein the target working position is a position where a corresponding turning pin of the reference hydraulic cylinder is inserted into a fitting hole; and
performing a function inspection of movement execution modules for the plurality of hydraulic cylinders in sequence based on the reference length and the length relationship table, comprising: moving each of the plurality of hydraulic cylinders to a turning limit position, and inserting the turning pin into the fitting hole or pulling the turning pin out of the fitting hole to determine that the turning system meets a first starting condition.

7. The control method for the hydraulic control turning system of the generator rotor according to claim 2, wherein before obtaining the current lengths of the plurality of hydraulic cylinders when the plurality of hydraulic cylinders are located at the error correction positions, the following steps are performed:
obtaining a reference length of the reference hydraulic cylinder when it is located at a target working position, wherein the target working position is a position where a corresponding turning pin of the reference hydraulic cylinder is inserted into a fitting hole; and
performing a function inspection of movement execution modules for the plurality of hydraulic cylinders in sequence based on the reference length and the length relationship table, comprising: moving each of the plurality of hydraulic cylinders to a turning limit position, and inserting the turning pin into the fitting hole or pulling the turning pin out of the fitting hole to determine that the turning system meets a first starting condition.

8. The control method for the hydraulic control turning system of the generator rotor according to claim 1, wherein before obtaining the current lengths of the plurality of hydraulic cylinders when the plurality of hydraulic cylinders are located at the error correction positions, the following steps are performed:
obtaining a reference length of the reference hydraulic cylinder when it is located at a target working position, wherein the target working position is a position where a corresponding turning pin of the reference hydraulic cylinder is inserted into a fitting hole; and
performing a function inspection of movement execution modules for the plurality of hydraulic cylinders in sequence based on the reference length and the length relationship table, comprising: moving each of the plurality of hydraulic cylinders to a turning limit position, and inserting the turning pin into the fitting hole or pulling the turning pin out of the fitting hole to determine that the turning system meets a first starting condition.

9. The control method for the hydraulic control turning system of the generator rotor according to claim 8, wherein in the function inspection of the movement execution modules, an insertion signal and a pullout signal of each of the turning pins are acquired to determine that the turning system meets the first starting condition.

10. The control method for the hydraulic control turning system of the generator rotor according to claim 8, further comprising:
performing a limit position inspection for the plurality of hydraulic cylinders, comprising moving the plurality of hydraulic cylinders to a limit position of the cylinder.

11. The control method for the hydraulic control turning system of the generator rotor according to claim 10, wherein the limit position inspection further comprises acquiring lengths of the plurality of hydraulic cylinders at the limit positions to determine that the turning system meets a second starting condition.

12. The control method for the hydraulic control turning system of the generator rotor according to claim 1, wherein the reference hydraulic cylinder is a hydraulic cylinder of the plurality of hydraulic cylinders having a minimum angle with respect to a horizontal plane.

13. A control device for a hydraulic control turning system of a generator rotor, comprising:
a first detecting unit configured to acquire current lengths of a plurality of hydraulic cylinders when the plurality of hydraulic cylinders are located at error correction positions;
a storage unit configured to store a length relationship table between the plurality of hydraulic cylinders of the hydraulic control turning system, wherein the length relationship table includes information relating to a relationship between a length of each of the plurality of hydraulic cylinders and the length of the other of the plurality of hydraulic cylinders, the length of each of the plurality of hydraulic cylinders being a measure of how much the hydraulic cylinder is extended or retracted; and
a control unit configured to, using a current length of a reference hydraulic cylinder as a determining reference, adjust the lengths of the plurality of hydraulic cylinders other than the reference hydraulic cylinder corresponding to a next driving stroke to conform to the length relationship table.

14. The control device for the hydraulic control turning system of the generator rotor according to claim 13, wherein the first detecting unit is further configured to acquire a reference length of the reference hydraulic cylinder when it is located at a target working position, to allow the control unit to control the plurality of hydraulic cylinders to perform a function inspection of movement execution modules in sequence based on the reference length and the length relationship table, wherein the function inspection of the movement execution modules comprises: moving the plurality of hydraulic cylinders to turning limit positions, and inserting turning pins into fitting holes or pulling the turning pins out of the fitting holes.

15. The control device for the hydraulic control turning system of the generator rotor according to claim 14, wherein the control unit is further configured to control the plurality of hydraulic cylinders to perform a limit position inspection, and the limit position inspection comprises moving the plurality of hydraulic cylinders to a limit position.

16. The control device for the hydraulic control turning system of the generator rotor according to claim 15, further comprising:
    a second detecting unit configured to acquire an insertion signal and a pullout signal of each of the turning pins, and output the insertion signal and the pullout signal to the control unit to determine that the turning system meets a starting condition.

* * * * *